United States Patent [19]

DeLong

[11] Patent Number: 4,474,478
[45] Date of Patent: Oct. 2, 1984

[54] BATCH MIXER FOR MIXING LIVESTOCK FEEDS

[76] Inventor: George F. DeLong, 225 West Woods Dr., Lititz, Pa. 17543

[21] Appl. No.: 556,662

[22] Filed: Nov. 30, 1983

[51] Int. Cl.³ ............................................. B01F 9/08
[52] U.S. Cl. .................................. 366/186; 366/187; 366/196; 366/222; 366/228; 366/233; 366/603
[58] Field of Search ............... 366/184, 186, 187, 188, 366/196, 220, 225, 190, 194, 195, 222, 224, 228, 54, 56, 57, 63, 233, 603

[56] References Cited

U.S. PATENT DOCUMENTS

| | | | |
|---|---|---|---|
| 1,558,580 | 10/1925 | Bishop | 366/184 |
| 1,713,568 | 5/1929 | Swenson . | |
| 2,797,070 | 6/1967 | Winn . | |
| 3,792,536 | 2/1974 | McGehee . | |
| 3,829,066 | 8/1974 | Phillips . | |
| 4,049,240 | 9/1977 | Walters . | |
| 4,075,710 | 2/1978 | Jakob | 366/25 |
| 4,444,509 | 4/1984 | Steiner | 366/157 |

FOREIGN PATENT DOCUMENTS 631139 10/1978 U.S.S.R. .

OTHER PUBLICATIONS

Advertising Brochure by Farmmaster, Inc. of New Holland, PA, "Total Mixed Ration with Tumble Mix Rotation", (FB-682-2), date unknown.
Advertising Brochure by Steiner Corporation of Driville, OH; entitled "A Totally Mixed Ration with Roll-A-Mix", date unknown.

Primary Examiner—Robert W. Jenkins
Attorney, Agent, or Firm—Michael R. Swartz

[57] ABSTRACT

A small batch mixer having a cylindrical mixing drum which defines a closed mixing chamber is provided for the mixing of livestock feeds in a dust-free operation. Materials are loaded into the mixing chamber through an access opening in the sidewall whereas materials are unloaded through a discharge outlet in the end-wall. The drum is supported for rotation about its longitudinal axis and is inclined such that the materials move by gravity from the front portion to the rear portion of the mixing chamber. As the drum is rotated, vanes along its sidewall tumbles the materials about the mixing chamber while an auger disposed along the longitudinal axis of the drum conveys the materials from the rear portion to the front portion of the mixing chamber in thereby achieving a thorough mixing of the materials. The auger is supported at only one end of the mixing drum. To unload the feed mixture, an auger tube extension which is slidably mounted on the auger is extended out through the discharge outlet to divert the material flow path from within to a location remote of the mixing chamber.

17 Claims, 5 Drawing Figures

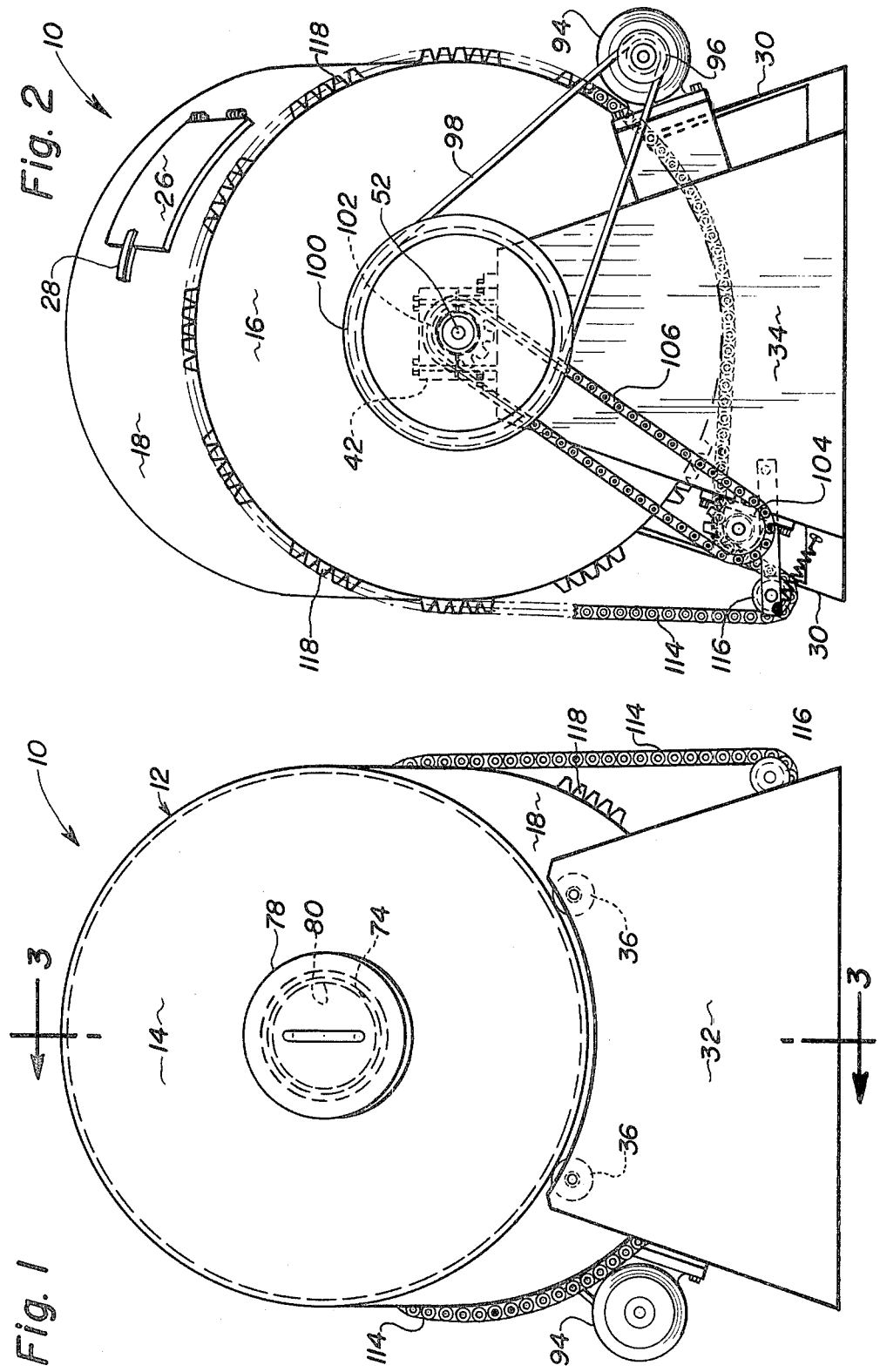

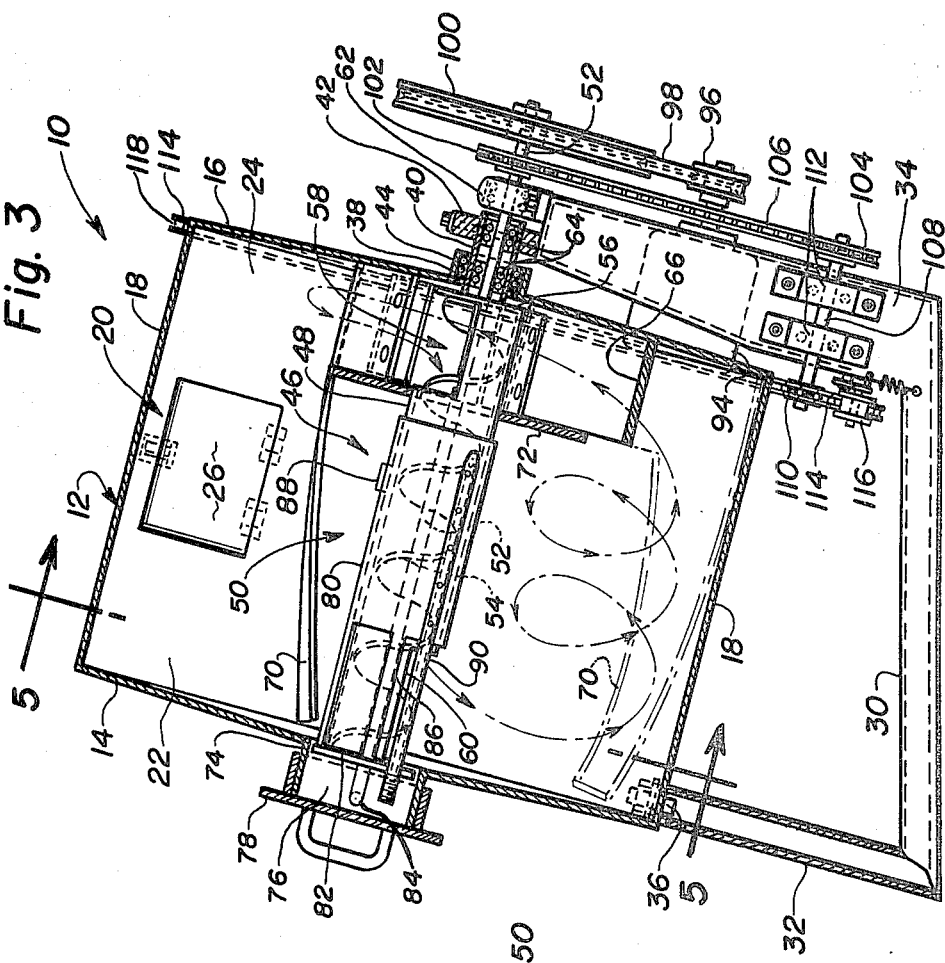
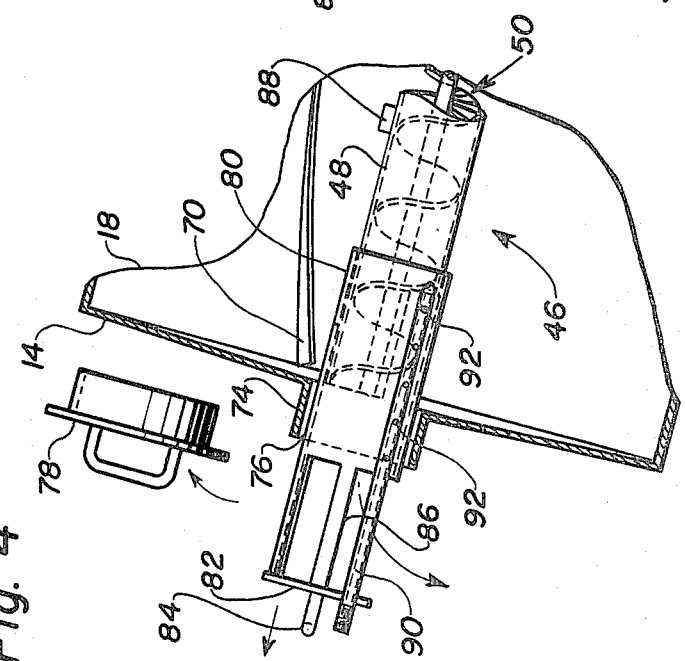

BATCH MIXER FOR MIXING LIVESTOCK FEEDS

BACKGROUND OF THE INVENTION

The present invention relates generally to feed mixers used in the agricultural industry, and more particularly, is directed to a small batch mixer for mixing several feed ingredients together to produce a livestock feed mixture having its ingredients uniformly distributed throughout the mixture.

As well known, livestock are no longer just fed corn, grain, silage and the like as was common in the past, but rather, today, with the many scientific and technical advancements made in the field of animal husbandry, livestock are now put on a planned diet and fed a ration consisting of precise amounts of several different feed ingredients, such as, but not limited to, ground grains, vitamins, mineral supplements and other such additives and the like. This is especially true in the dairy industry wherein the specific feed and the amount of that feed fed to a dairy cow not only affects the amount of milk produced by the cow, but also affects the butterfat content of the milk which directly effects the profit and loss of the dairy operation.

These new feed mixtures require a thorough and complete mixing together of the ingredients to obtain a uniform mixture. Livestock operators have the option of going to a commercial feed mill and purchase a specified premix, have the mill mix a feed mixture according to a desired formula, or hire a jockey with a portable feedmill to come to the farm and do the mixing for him. These options are not only expensive but also inconvenient to the livestock operator. An alternative solution is for the livestock operator to have his own feed mixer unit if his operation justifies such a purchase. One type of a feed mixer unit known on the market is the one commercially sold by Farmmaster, Inc., of New Holland, Pa. The Farmmaster mixer is a rather large scale unit specifically designed to mix several bushels of feed at one time, and may be suitable and practical to those operators having a relatively large livestock operation, but for the livestock operator managing a small operation, such a purchase may not be economically practical. In addition to the large size of this unit which requires sufficient room for storage, the dust generated during the mixing operation is forced out the front opening in the unit in creating a very dusty and unhealthy work environment. Yet another disadvantage of the Farmmaster unit is that some of the materials tend to cake or build-up on the rear corners and along the rear wall and thus, are not mixed thoroughly with the other materials, resulting in a non-uniform distribution of the ingredients in the feed mixture.

SUMMARY OF THE INVENTION

Briefly, the present invention provides a small and compact feed mixer for batch mixing of several livestock feed ingredients to produce a feed mixture with its ingredients uniformly distributed throughout. The mixer is of simple design and construction, being relatively inexpensive to manufacture, and thus, affordable to many small farmers and livestock operators. The mixing of the ingredients takes place in a closed tank to assure dust free operation. The mixer has been so designed in providing an effective and efficient mixing operation such that all ingredients are thoroughly mixed with one another in thereby eliminating the possibility of any build-up of materials on the walls of the mixing tank.

Accordingly, the present invention sets forth an agricultural batch mixer for mixing of livestock feed materials to produce a resulting feed mixture of uniform distribution. The batch mixer includes a mixer drum, preferably of a cylindrical shape, having a front end-wall, a rear end-wall, and a contiguous curved sidewall defining therewithin a closed mixing chamber. Materials are loaded into the mixing chamber, through an access door, preferably being located on the sidewall. The drum is supported on a frame structure for rotation about its longitudinal axis, and in the prefered embodiment, the drum is disposed on an incline such that the materials flow by gravity from the front portion to the rear portion of the mixing chamber. Mounted on the sidewall and within the mixing chamber is at least one, and preferably three, longitudinally extending vanes for tumbling the feed materials about the chamber as the drum is rotated.

The batch mixer further includes elongated conveyor means supported at one end adjacent the rear end-wall and extending through the mixing chamber along the longitudinal axis of the drum. The conveyor means includes an inlet for receiving materials in the rear portion of the mixing chamber and an outlet for discharging the received materials into the front portion of the mixing chamber and is operable to convey the materials from the inlet to the outlet. In the preferred embodiment, the conveyor means takes on the form of an auger tube with a rotatable auger disposed within the tube. The auger is fixably supported at one end adjacent the rear end-wall of the drum so as to remain stationary as the drum is rotated around the tube while the auger is rotated within the tube. Paddle scoops are mounted on the rear end-wall of the drum to lift and then funnel the materials in the rear portion of the mixing chamber into the inlet of the auger conveyor as the drum is rotated. To prevent indirect infeeding of materials into the inlet so as to eliminate the possibility of material build-up on the walls of the mixing chamber, baffle means, in the form of a plate has been provided to deflect the axial flow of materials along the auger conveyor radially outwardly toward the sidewall of the mixing chamber. The baffle plate is spaced inwardly from the rear end-wall, adjacent the inlet, and preferably, surrounds the auger conveyor.

To unload the feed mixture from the mixing chamber, an auger tube extension has been provided to divert the flow of materials from within to a location remote of the mixing chamber. The tube extension is movably mounted on the forward end portion of the auger tube for movement between an inward non-unloading position and an outward unloading position wherein the tube extension extends through a discharge outlet provided in the front end-wall of the drum. In its inward non-unloading position, an opening provided in the tube extension registers with the outlet of the auger tube for uninterrupted flow of materials through the auger tube an into the front portion of the mixing chamber.

The batch mixer further includes drive means for rotating the drum about its longitudinal axis and for rotating the auger within the auger tube. Preferably the drum is rotated in one direction whereas the auger is rotated in an opposite direction. The invention further includes means for injecting a liquid feed ingredient into the mixing chamber to be intermixed with and dispersed throughout the dry materials therein. The liquid ingredient is introduced within the central region of the mixing chamber while the dry materials are being mixed to thereby prevent material clumping.

These and other advantages and attainments of the present invention will become apparent to those skilled in the art upon a reading of the following detailed description when taken in conjunction with the attached drawings where there is shown and described an illustrational embodiment of the invention.

BRIEF DESCRIPTION OF THE DRAWINGS

In the course of the following detailed description, reference will be made to the attached drawings in which:

FIG. 1 is a front elevation view of the batch mixer constructed in accordance with the principles of the present invention.

FIG. 2 is a rear elevational view of the batch mixer shown in FIG. 1.

FIG. 3 is a generally longitudial sectional view of the mixing drum as taken along line 3—3 of FIG. 1 with the front portion of the base frame being broken away and with the rearward portion of the base frame being seen in elevation for a clearer viewing of the drive means. Directional arrows have been provided to indicate the flow path of the materials as they are transferred about the mixing chamber.

FIG. 4 is a fragmentary view of the front portion of the mixing drum shown in FIG. 3 with the dust cover being removed and with the unloading auger tube extension being seen in its extended position for discharge of the feed mixture from the mixing chamber.

DETAILED DESCRIPTION OF THE INVENTION

Figure 5:
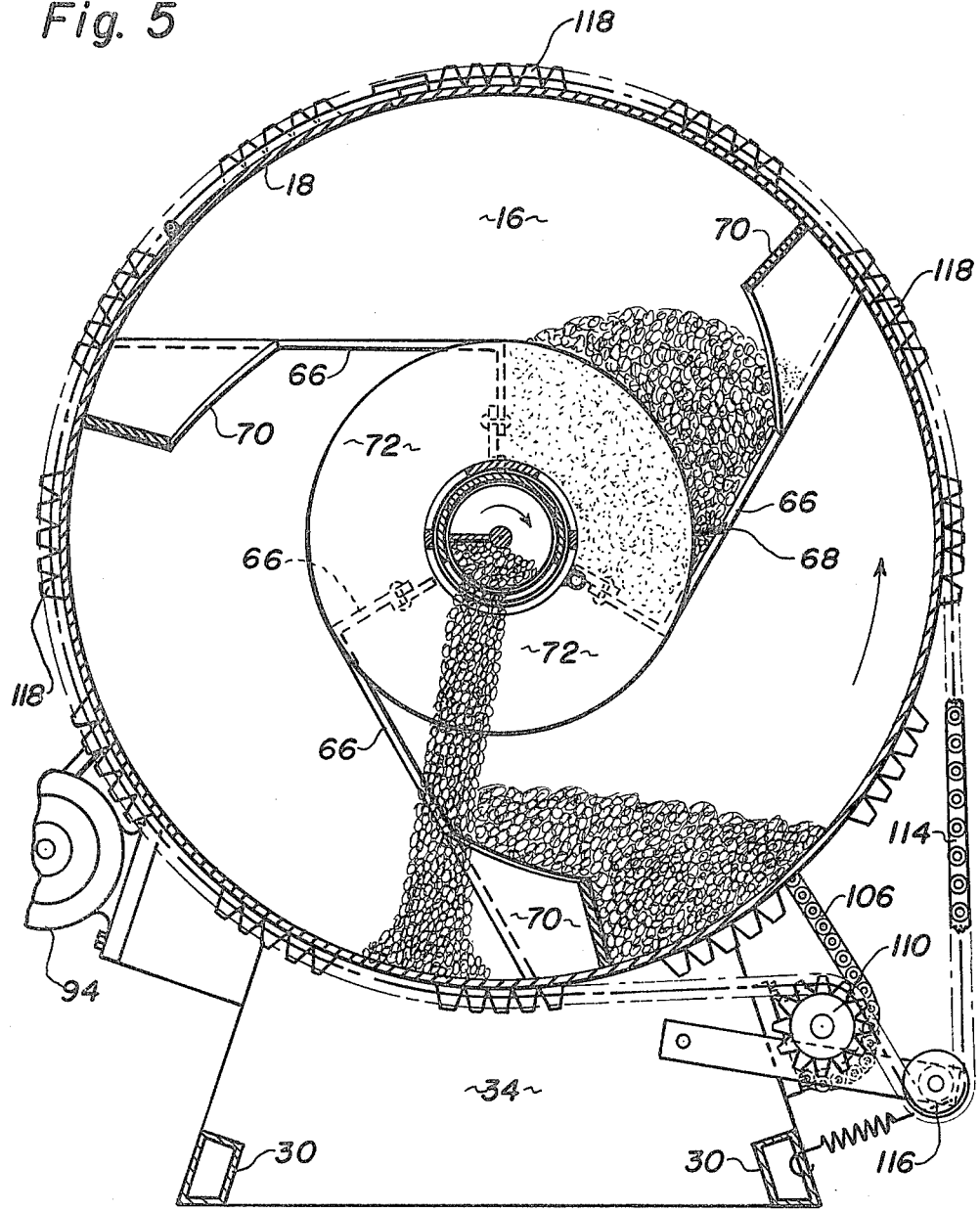
FIG. 5 is an enlarged sectional view as taken along line 5—5 of FIG. 3 looking into the mixing drum with some of the materials being scooped up and funneled into the rear inlet of the return auger conveyor while other materials are being discharged out the front of the auger conveyor into the front portion of the mixing chamber.

In the following description, like reference characters designate like or corresponding parts throughout the several views. Also, in the following description, it is to be understood that such terms as "forward", "rearward", "left", "right", "upwardly", "downwardly", and the like, are words of convenience and are not to be construed as limiting terms.

Now referring to the drawings, and particularly to FIGS. 1, 2, and 3, there is shown a batch mixer, generally designated by the numeral 10, constructed in accordance with the principles of the present invention. The batch mixer 10 basically includes a generally cylindrical mixing drum 12 comprised of a front end-wall 14, a rear end-wall 16, and a contiguous curved sidewall 18 defining therewithin a closed mixing chamber 20 with the front portion of the mixing chamber being referred to by the numeral 22 and the rear portion of the chamber being referred to by the numeral 24 (best seen in FIG. 3). For loading the feed materials, being of a generally dry state, into the mixing drum 12, access means, preferably in the form of a hinged access door 26 is provided on the sidewall 18. The door 26 is sealed to prevent escape of dust from the mixing chamber 20 and is provided with a latch means 28 for locking the door in its sealed position as the drum 12 is rotated during the mixing operation.

The drum 12 is supported for rotation about its longitudinal axis on a frame structure which basically comprises a pair of, transversely spaced, elongated base members 30 (see FIGS. 2 and 3), a front upright 32 secured to the respective front ends of the base members 30, and a rear upright 34 secured to the respective rear ends of the base members 30. As best seen in FIG. 1, the top surface of the front upright 32 is concaved, generally conforming to the shape of the curved sidewall 18 of drum 12, and carries a pair of transversely spaced rollers 36 which restably support the front end of drum 12. For support of the rear end of drum 12, a neck section 38 is provided on the rear end-wall 16 which defines a central opening in wall 16. A short sleeve 40 extends through this central opening, along the longitudinal axis of drum 12, with the outward end of sleeve 40 being fixably supported by a clamping bracket 42 mounted on the upper end of rear frame upright 34. Bearings 44 are disposed between the neck section 38 and sleeve 40. The arrangement is such that drum 12 is supported by and rotates about the stationary sleeve 40 while the fromt of the drum revolves over rollers 36 which are in movable contact therewith. As best seen in FIG. 3, in the preferred embodiment, the cylindrical mixer drum 12 is disposed on an incline with its longitudinal axis forming an acute angle of approximately ten-twenty degrees with the horizontal. With such incline disposition, the materials in the mixing chamber 20 move or flow by gravity rearwardly from the front portion 22 to the rear portion 24 as drum 12 is rotated. It will be appreciated by those skilled in the art that in accordance with the principles of the present invention, drum 12 may be in the shape of a frustrum rather than being cylindrical, and in such case, its axis would be generally horizontal.

While still referring to FIG. 3, the batch mixer 10 further comprises conveying means, in the form of an elongated auger conveyer, generally indicated by the numeral 46, for returning the materials from the rear portion 24 to the front portion 22 of chamber 22. The auger conveyor 46 includes a hollow auger tube 48 and a rotatable auger 50 having a shaft 52 and spiral flighting 54, disposed within tube 48. The auger conveyor 46 extends across the mixing chamber 20, being disposed along the longitudinal axis of drum 12, with auger tube 48 and auger 50 being coaxial with the axis of drum 12. The forward end of the auger tube 48 is open whereas its rearward end includes an end-plate 56 which is suitably secured to the inward end of sleeve 40 for cantilevered support of the tube 48 within mixing chamber 20. An inlet opening 58 is provided in the upper surface on one end of tube 48, adjacent end-plate 56, for receiving materials thereinto from the rear mixing portion 24 and a discharge opening 60 is provided on the lower surface of the opposite end of tube 48 for discharging of the materials into the front portion 22 of mixing chamber 20. The portion of auger 50 with flights 54 is disposed within the auger tube 48, extending substantially the full axial length of the tube, from end-plate 56 on its one end to its opposite open end which is disposed adjacent the front end-wall 14 of drum 12. The auger shaft 52 extends outwardly through end-plate 56, the center of sleeve 40, and terminates a short distance beyond the rear upright frame member 34 where a support bracket 62, mounted on the top surface of upright 34, provides for axial shifting support of shaft 52, while bearings 64, disposed between the shaft and sleeve 40, provide for rotational support, as the auger 50 is rotated within auger tube 48.

As drum 12 is rotated, materials in the rear portion 24 of mixing chamber 20 are scooped up and funneled into the inlet opening 58 of tube 48 by paddle scoops 66. Scoops 66 are mounted on the rear end-wall 16 and extend radially outwardly from tube 48 toward the sidewall 18. Preferably, there are three such scoops being circumferentially spaced, with each scoop 66 being of an L-shape configuration in forming a pocket 68 which lifts the materials from the lower section of the mixing chamber and delivers it into the inlet opening as the scoops 66 rotate with the drum 12.

Again referring to FIGS. 3 and 5, three longitudinally extending vanes 70 function to tumble the materials about the mixing chamber 20 as drum 12 is rotated. Vanes 70 are mounted to and extend along sidewall 18, from the front end-wall 14 to the rear end-wall wall 16. Preferably, the rear-end portion of each vane 70 is co-linear with the outer end-portion of a corresponding paddle scoop 66. Although the vanes 70 may be parallel to the longitudinal axis of drum 12, it is preferred that vanes 70 are skewed with respect to this axis, being slanted or inclined (from front to rear) in the direction of the rotation of drum 12 (see FIG. 5) so as to direct the materials rearwardly as the vanes rotate along with the sidewall. As can be appreciated, the rearward flow of the materials caused by the oblique orientation of vanes 70 compliments the gravitation flow of the material rearwardly due to the elevated disposition of drum 12. The greater the degree of inclination of vanes 70, the lesser degree of inclination of drum 12 is required to obtain the same flow rate of the materials from the front to the rear of the mixing chamber 20; and vice versa, the lesser degree of inclination of vanes 70, the greater degree of inclination of 12 is required to obtain the same front-to-rear material flow rate.

Before describing the other components of the batch mixer 10, a brief description of the mixing operation which takes place within the mixing chamber 20 will first be given. Briefly, after the materials have been loaded into the mixing chamber 20 through the access door opening 26 and the door has been sealed closed by the locking latch mechanism 28, drum 12 is rotated (in a counter-clockwise direction as viewed in FIG. 5) whereby the vanes 70 tumble the materials over and about the mixing chamber 20, and, at the same time, in cooperation with the gravitational flow, directs the materials rearwardly towards and to the rear portion 24 of the chamber. In the rear portion 24, the paddle scoops 66, with the aid of pockets 68, lift the materials and funnel them into the inlet opening 58 whereby spiral flights 54, upon rotation of the auger 50, convey the materials forwardly through tube 48 to the front discharge opening 60 where the materials are discharged into the front portion 22 of mixing chamber 20. The materials from the front portion 22 are then recycled, via vanes 70, to the rear portion 24 where they are again returned by auger 50 to the front portion 22. This operation is continuous and repeated until the materials are uniformly distrubuted throughout the mixture.

During this mixing operation, it has been observed, that although the paddle scoops 66 funnel the materials directly into the inlet opening 58, an indirect flow of materials into the inlet opening also occurs by the materials moving axially along and adjacent tube 48. This indirect flow or infeeding of materials tends to cause a material build-up or caking across the end corners of the drum 12 (between sidewall 18 and rear end-wall 16) and on the rear end-wall, which results in these caked materials not being intermixed with the other materials of the mixture. Furthermore, this build-up of materials forms a barrier restricting the actual size of the inlet opening in thereby reducing the feed rate of materials into the auger 50, and thus, reducing the the overall operating efficiency of the batch mixer 10. To eliminate the problems associated with this infeed of materials, in the preferred embodiment, the batch mixer 10 is provided with baffle means in the form of plate 72, disposed in rear portion 24 of mixing chamber 20, for deflecting the flow of materials along the auger tube 48 radially outwardly toward the sidewall 18 where the materials are then fed directly into inlet opening 58 by the paddle scoops 66. Preferably, as best seen in FIG. 5, baffle plate 72 surrounds and is generally perpendicular to tube 48, being disposed adjacent the inward edge of inlet opening 58 and being mounted on paddle scoops 66. The mounting is such that baffle plate 72 rotates, along with scoops 66, about tube 48 upon rotation of drum 12. In the alternative, plate 72 could be mounted directly on auger tube 48. Plate 72 also serves as the fourth side to the pockets 68 (the first, second and third sides being respectively defined by the two legs of the paddle scoop and the rear end-wall) thereby increasing the quantity of materials lifted vertically by the pockets 68 of scoops 66.

Now, while referring particularly to FIG. 4, the simple and unique means for unloading the material mixture from the mixing chamber 20 will be described. Mounted on the front end-wall 14 of drum 12 is a front neck section 74 defining a central discharge outlet 76 in the wall, with the outlet 76 being of a slightly larger diameter than the diameter of the auger tube 48 and being axially aligned therewith. The discharge outlet 76 is provided with a removable dust cover 78 which fits over and snugly around the neck section 74 to prevent dust from escaping from the mixing chamber 20 during the mixing operation. Surrounding the forward end portion of auger tube 48 and movably mounted thereon is an auger tube extension 80 having a closed end 82 with a handle 84, mounted on the outward face thereof, and with a discharge port 86 being defined in the lower surface of the tube extension, adjacent the closed end 82. Tube extension 80 is slidably movable on auger tube 48 between an inward non-loading position (as shown in FIG. 3) wherein its discharge port 86 is in registry with the discharge opening 60 of tube 48 for uninterrupted flow of materials through the auger tube 48 and into the front portion 22 of mixing chamber 22; and an outward unloading position (as seen in FIG. 4) wherein the tube extension 80 extends through the central discharge outlet 76 in positioning the discharge port 86 exteriorly of drum 12 for diverting the flow of the materials through the tube extension and discharge thereof remote of the mixing chamber 20. For proper alignment and to prevent the tube extension 80 from rotating about the auger tube 48, an axially extending V-shaped slot (not shown) has been provided on the upper surface of the inward end of tube extension 80 for mating with alignment tab 88 mounted on the top surface of auger tube 48. When the materials have been thoroughly mixed within chamber 20 and its time to unload, the operator removes the dust cover 78 and slides the extension tube 80 through outlet 76, via handle 84, to its outward unloading position whereupon the auger 50 forces the materials through the tube extension and out through the discharge port 86, now being located remote of the mixing chamber 20. In its extended unloading position, the inward section of tube extension 80 covers the discharge opening 60 of tube 48, blocking material flow therethrough and thereby diverting the flow path of the materials through the extension 80.

Most batch mixers are limited to the mixing of only dry materials because generally the introduction of a liquid causes the materials to clump which is undesirable; however, since many of the feed ingredients on the market (such as high protein oils, etc.) are only in a liquid state, or its more economical to use and purchase them in a liquid state verses a dry state, it is advantegeous to be able to add a liquid to the dry materials and obtain a uniform dispersion of the liquid throughout the dry mixture without the undesirable clumping of the materials as experienced with prior-art mixers. Through trial-and-error, the inventor found that if a liquid is introduced into the central region of the mixing zone as the dry materials are tumbled thereabout, clumping is eliminated and the liquid is uniformly dispersed throughout the dry mixture. Thus, batch mixer 10 incoporates means for injecting liquids into the mixing chamber 20 to be blended with the dry material mixture. The liquid injection means basically comprises an elongated tube 90 having several spaced openings 92 provided along its length for dispersing a liquid into the central region of the mixing chamber 22 and onto the dry materials as they are being mixed therewithin. Liquid dispersion tube 90 is attached to tube extension 80 with the outward end tube 90 being adapted to be connected to a suitable source of liquid (now shown) for supplying a liquid through the tube 90 and out through the dispersing openings 92 and onto the dry materials.

The batch mixer 10 further includes appropriate drive means for rotating the drum 12 about its longitudinal axis, as well as, for rotating the auger 50 within the auger tube 48. The drive comprises a suitable power source, such as electric motor 94, mounted on the left-hand side (see FIG. 1) of rear upright frame member 30, which drives a drive pulley 96 (see FIG. 2) which is operably connected by a V-belt 98 to a larger driven pulley 100, mounted on the rear terminal end of auger shaft 52 (see FIG. 3), for rotating the auger 50 within auger tube 48. Rotation of mixing drum 12 is provided by a drive sprocket 102, mounted on auger shaft 52 inwardly of pulley 100, being connected to sprocket 104, via chain 106, for driving the transverse shaft 108 and sprocket 110 therewith. Drive shaft 108 is mounted on the right-hand side of the lower portion of the rear upright frame 34 by suitable bearing brackets 112, with sprocket 104 being secured to the right end and sprocket 110 being secured to the left end of shaft 108 (see FIG. 3). Chain 114 is entrained around sprocket 110, over chain tensioning sprocket 116, and around sprocket teeth segments 118. Sprocket teeth segments 118 are mounted to and circumferentially spaeced around the rearward end of the curved sidewall 18 of drum 12. As can be appreciated, with such mounting of the sprocket teeth 118 on drum 12, the drum 12 functions as a very large sprocket and serves as an inexpensive gear reduction box. As represented by the direction arrow seens in FIG. 5, the above-described drive arrangement, of the preferred embodiment, is such that the drum 12 is rotated in a counter-clockwise direction while the auger 50 is rotated in a clockwise direction.

It is thought that the invention and many of its attendant advantages will be understood from the foregoing description and it will be apparent that various changes may be made in form, construction and arrangement of the batch mixer 10 without departing from the spirit and scope of the invention of sacrificing all of its material advantages, the form hereinbefore being merely a preferred or exemplary embodiment thereof.

What is claimed is:

1. An agricultural batch mixer for mixing of livestock feed materials into a homogeneous mixture comprising:
   (a) a mixer drum having a front end-wall, a rear end-wall, and a contiguous curved sidewall defining therewithin a closed mixing chamber, said drum being provided with an access door for loading materials into said mixing chamber;
   (b) means supporting the mixer drum for rotation about the longitudinal axis thereof with the drum being disposed with respect to a horizontal plane such that said front end-wall is elevated relative to said rear end-wall for gravitational movement of the material from the front portion to the rear portion of the mixing chamber;
   (c) elongated conveyor means supported at one end adjacent said rear end-wall and extending through said mixing chamber along the longitudinal axis of said drum, said conveyor means having an inlet for receiving materials in the rear portion of the mixing chamber and an outlet for discharging materials into the front portion of said mixing chamber and operable to convey materials from said inlet to said outlet;
   (d) means interiorly of and mounted on said drum for tumbling the materials about the mixing chamber upon rotation of said drum and while said materials move from the front to the rear portion of said mixing chamber by gravitational forces;
   (e) means on said rear end-wall for funneling the materials in the rear portion of the mixing chamber into said inlet upon rotation of said drum;
   (f) unloading means cooperable with said auger means and movable between an inward non-unloading position and an extended unloading position wherein the materials being discharged from said outlet are diverted through an opening provided in said front end-wall to a location remote of said mixing chamber; and
   (g) drive means for rotating said drum and operating said conveyor means.

2. The batch mixer as defined in claim 1, wherein said drum is a cylinder having its longitudinal axis being inclined relative to a horizontal.

3. The batch mixer as defined in claim 1, wherein said access door is defined in said curved sidewall and disposed approximately midway between said front end-wall and said rear end-wall.

4. The batch mixer as defined in claim 1, wherein said means for tumbling the materials about said mixing chamber includes at least one longitudinally extending vane mounted on said sidewall.

5. The batch mixer as defined in claim 4, wherein said vane extends between said front end-wall and said rear end-wall.

6. The batch mixer as defined in claim 4, wherein said vane is skewed relative to the longitudinal axis of said drum so as to assist the gravitational force in directing the material rearwardly toward the rear portion of said mixing chamber as said drum is rotated.

7. The batch mixer as defined in claim 1, wherein said funneling means includes at least one paddle scoop extending radially outwardly from the longitudinal axis of said conveyor means and toward said sidewall.

8. The batch mixer as defined in claim 7, wherein said paddle scoop is L-shaped with its legs defining a pocket for scooping up material from the bottom of the drum and delivering it to said inlet as said drum is rotated.

9. The batch mixer as defined in claim 1, wherein said means for supporting said mixer drum includes:
 a framework having a generally upright frame structure disposed adjacent said rear end-wall;
 a sleeve fixably mounted on said upright frame structure and extending through said rear end-wall along the longitudinal axis of said drum; and
 bearing means interposed between said sleeve and said rear end-wall for rotatably supporting said drum on said framework.

10. The batch mixer as defined in claim 9, wherein said means for supporting said mixer drum further includes roller means mounted on said framework and being in movable contact with the front portion of said sidewall as said drum is rotated about its longitudinal axis.

11. The batch mixer as defined in claim 9, wherein said conveyor means includes:
 an auger tube having an closed end and an open end with said closed end being fixably mounted on said sleeve and said inlet being defined by an opening in the upper section of said tube adjacent said closed end, and
 an auger disposed within said auger tube for conveying materials through said tube upon rotation thereof.

12. The batch mixer as defined in claim 11, wherein said outlet is defined by an opening in the lower section of said auger tube adjacent said open end.

13. The batch mixer as defined in claim 11, wherein said unloading means includes an auger tube extension surrounding the forward end portion of said auger tube and being movably mounted thereon for movement between an inward non-unloading position for uninterrupted flow of material through said auger tube and into the front portion of said mixing chamber, and an unloading position wherein the tube extension extends through said front end-wall opening to divert the material flow path through said extension for discharging the materials remote of said mixing chamber.

14. The batch mixer as defined in claim 13, wherein:
 said outlet being defined by an opening in the lower section of said auger tube adjacent said open end;
 said auger tube extension having a closed outward end and a discharge port defined in a lower section of said extension tub adjacent said closed outward end;
 said discharge port being in open flow communication with said outlet opening when said tube extension is in its inward non-unloading position.

15. The batch mixer as defined in claim 1, further comprising baffle means disposed inwardly from said rear end-wall and adjacent said inlet for deflecting the rearward flow of materials axially along said conveyor means radially outwardly toward said sidewall.

16. The batch mixer as defined in claim 15, wherein said baffle means includes a radially extending plate surrounding said conveyor means and supported by said funneling means.

17. The batch mixer as defined in claim 1, wherein said feed materials being mixed into said mixture are of a generally dry state, further comprising means for dispersing of ingredients of a generally liquid state onto the dry materials during mixing thereof to prevent material clumping, said liquid dispersing means including:
 a tube disposed within said mixing chamber and adjacent the longitudinal axis of said drum, said tube having dispersion orifices spaced therealong and adapted to be connected to a source of liquid ingredients for dispersing same onto the dry materials as they are tumbled about said mixing chamber during the mixing operation.

* * * * *